US011346674B2

(12) United States Patent
Walpuck et al.

(10) Patent No.: US 11,346,674 B2
(45) Date of Patent: May 31, 2022

(54) ENHANCED TRANSPORTATION ROUTING FOR COMMUNICATION WITH DEVICES OF VEHICLES AND PASSENGERS

(71) Applicant: Ford Global Technologies, LLC, Dearborn, MI (US)

(72) Inventors: John Walpuck, West Bloomfield, MI (US); Jovan Zagajac, Ann Arbor, MI (US); Steve Skikun, Commerce Township, MI (US); Samer Ibrahim, Dearborn, MI (US); Helen Elizabeth Kourous-Harrigan, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 16/535,270

(22) Filed: Aug. 8, 2019

(65) Prior Publication Data

US 2021/0041253 A1 Feb. 11, 2021

(51) Int. Cl.
*G01C 21/34* (2006.01)
*G08G 1/09* (2006.01)

(52) U.S. Cl.
CPC ..... *G01C 21/3438* (2013.01); *G01C 21/3492* (2013.01); *G08G 1/09* (2013.01)

(58) Field of Classification Search
CPC ... G01C 21/3438; G01C 21/3492; G08G 1/09
See application file for complete search history.

(56) References Cited

U.S. PATENT DOCUMENTS

| | | | | |
|---|---|---|---|---|
| 2010/0070168 | A1* | 3/2010 | Sumcad | G01C 21/3438 701/467 |
| 2014/0172727 | A1 | 6/2014 | Abhyanker et al. | |
| 2016/0370194 | A1* | 12/2016 | Colijn | G01C 21/34 |
| 2017/0169535 | A1* | 6/2017 | Tolkin | G06Q 10/06311 |
| 2017/0344010 | A1* | 11/2017 | Rander | G05D 1/0217 |
| 2018/0136656 | A1* | 5/2018 | Rasmusson, Jr | G05D 1/0246 |
| 2019/0137291 | A1* | 5/2019 | Rong | G01C 21/3492 |
| 2020/0124425 | A1* | 4/2020 | Wengreen | G01C 21/3438 |

FOREIGN PATENT DOCUMENTS

| | | |
|---|---|---|
| WO | 2008/012175 A1 | 1/2008 |
| WO | 2013/061410 A1 | 5/2013 |

OTHER PUBLICATIONS

McLellan, C. (Mar. 1, 2018). What is V2X communication? Creating connectivity for the autonomous car era (12 pages). Retrieved from https://www.zdnet.com/article/what-is-v2x-communication-creating-connectivity-for-the-autonomous-car-era/.

* cited by examiner

*Primary Examiner* — Ramsey Refai
(74) *Attorney, Agent, or Firm* — Brandon Hicks; Eversheds Sutherland (US) LLP

(57) ABSTRACT

A transportation system comprising a logic node configured to determine an optimized rendezvous location for a vehicle in an area based at least in part on traffic data associated with a plurality of vehicles in the area; and a communication element adapted to communicate the optimized rendezvous location to the vehicle.

17 Claims, 6 Drawing Sheets

ID OF THE DISCLOSURE

ENHANCED TRANSPORTATION ROUTING FOR COMMUNICATION WITH DEVICES OF VEHICLES AND PASSENGERS

FIELD OF THE DISCLOSURE

This disclosure generally relates to systems, methods, and devices for transportation and, more particularly, to enhanced transportation routing.

BACKGROUND

In today's transportation ecosystem, bottlenecks can significantly hinder traffic. This is particularly apparent in areas that experience high burst traffic of pedestrian seeking ride sharing resulting in high vehicle traffic. Examples of these areas include airports, concert venues, and sports arenas. Improvements to traffic flow, particularly, in high burst traffic areas are needed.

BRIEF DESCRIPTION OF THE DRAWINGS

Drawings are illustrated by way of exemplary embodiments. The disclosure herein is not intended to be limited to the illustrated embodiments.

DETAILED DESCRIPTION

Figure 1:
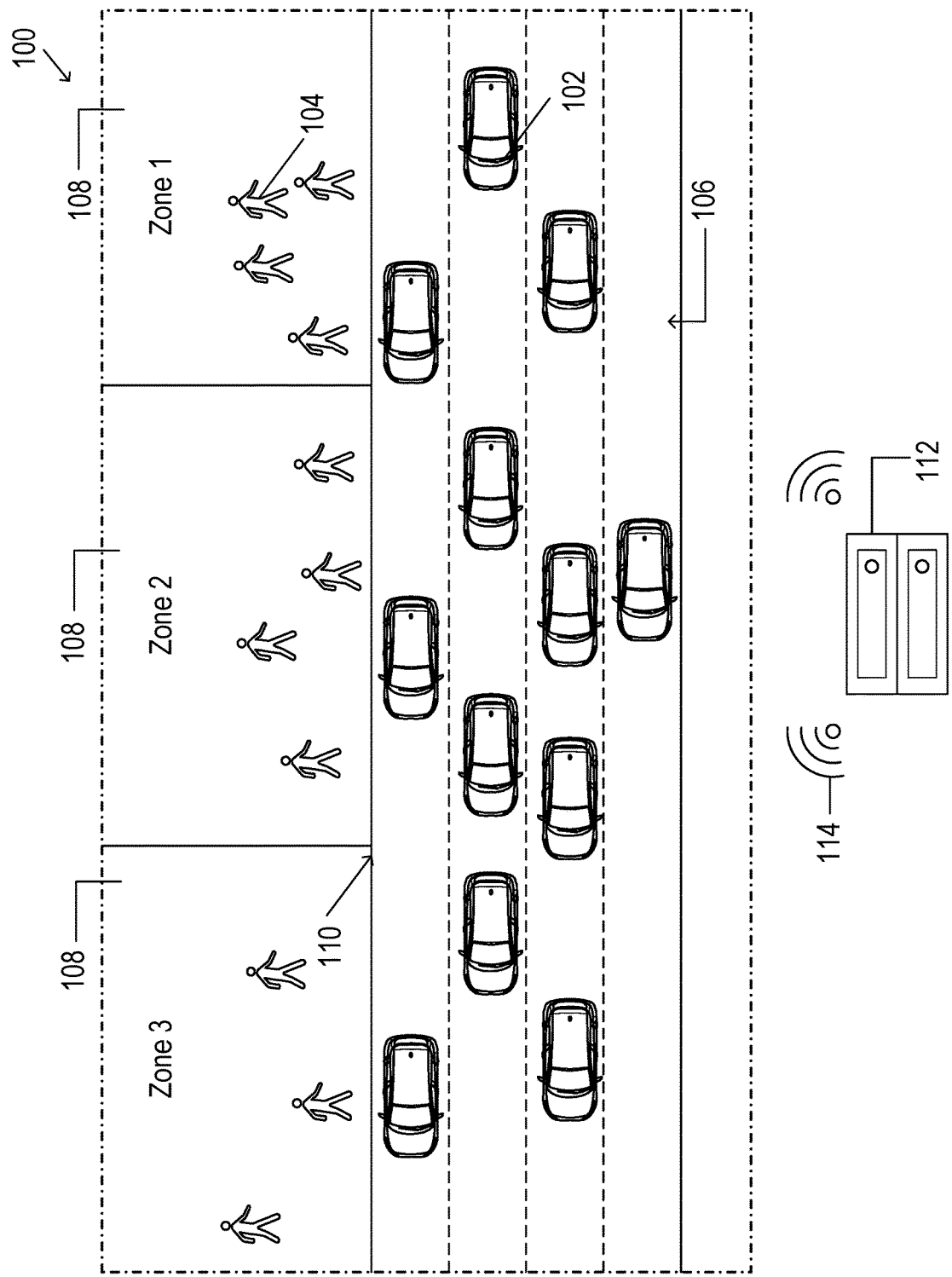
FIG. 1 includes a simplified view of an area including a plurality of vehicles and passengers in accordance with an embodiment.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

Example embodiments described herein provide certain systems, methods, and devices for enhanced transportation routing. The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

In today's transportation ecosystem, bottlenecks significantly hinder traffic in areas that experience bursts of people seeking roadway transportation. Examples of these areas include airports, concert venues, and sports arenas. Within these areas, there may be high volumes of people seeking rides, vehicles picking up and dropping off passengers, and emergency personnel responding to incidents. Bottlenecks within these areas exist in part due to lacking communication between the involved devices associated with a transportation scenario. These devices can include, for example, smart devices like smart phones and the like and vehicles having enhanced transportation routing system as described further herein.

Traditionally, communication has been sparse between multiple vehicles and between devices used by pedestrians. Moreover, rendezvous areas are poorly defined and often lack sufficient protocol and monitoring. It is not uncommon for vehicles to wait in poorly designated locations (e.g., within a faster moving lane) to pick up a person that has not yet arrived at the rendezvous location. This further slows traffic within the area, creating an inefficient and potentially dangerous ripple effect. There are numerous areas where traffic bottlenecks occur regularly. At best, these bottlenecks amount to time wasted by those slowed in traffic. At worst, distracted drivers attempting to navigate these areas may hit other vehicles or pedestrians. A solution to streamline high trafficked areas using enhanced transportation routing is demanded by roadway users.

Example embodiments of the present disclosure relate to systems, methods, and devices for enhanced transportation routing.

In one or more embodiments, an intelligent infrastructure of an enhanced transportation routing system can communicate with devices of vehicles and passengers to enable efficient and safe rendezvous in areas of high traffic. Passengers refer to people who are or may become passengers within a vehicle in the area of the transportation scenario. In a particular instance, a passenger may be a prospective passenger and a current pedestrian. Intelligent infrastructure refers to a logic node configured to perform a computational process. The logic node can be disposed within, or external to, the area of the transportation scenario. In an embodiment, the logic node can include one or more low-latency, short-range wireless communication devices.

In one or more embodiments, the intelligent infrastructure of the transportation system can notify nearby devices associated with a transportation scenario (e.g., devices of passengers and vehicles within range) of its presence and role. In certain instances, the intelligent infrastructure can further communicate an authentication certificate to the nearby devices to authenticate the secured identity and features of the intelligent infrastructure.

In one or more embodiments, after a passenger creates a passenger pickup request using a device (e.g., a mobile phone or the like) and a vehicle is assigned to pick up the passenger, the infrastructure can analyze traffic data in the area of the transportation scenario to determine an optimized rendezvous location for the passenger and vehicle. In an embodiment, traffic data can include information corresponding with the locations, speeds, trajectories, anticipated or estimated routes, or combinations thereof associated with the plurality of vehicles in the area. By way of non-limiting example, an airport concourse may include three vehicle lanes passing through three zones for passenger pickup. The infrastructure may determine vehicle and passenger positioning within the three lanes and three zones, pairing vehicle and passenger at rendezvous locations best suited for one or both parties. An optimized rendezvous location may refer to at designated areas of rendezvous between a passenger associated with a first device and a vehicle associated with a second device. The optimized rendezvous location may correspond with a location of rendezvous best configured to optimize movement of parties associated with devices in the area. Optimized movement may occur with respect to the individual parties of a transportation scenario, between the parties associated with the transportation scenario and other parties in the area, or both.

In one or more embodiments, the optimized rendezvous location can be further based on a layout of the area of the transportation scenario. For instance, the optimized rendezvous location can be based at least in part on one or more vehicular lanes, zones (e.g., no parking zones, emergency vehicle zones, quick loading zones, extended-time loading zones, etc.), sidewalks, crosswalks, underpasses, overpasses, intersections, traffic lights or signage, or any combination thereof. In an embodiment, the infrastructure can have knowledge of the layout and rules (e.g., driving laws and zones) of the area.

In one or more embodiments, the infrastructure can be configured to recognize and accommodate individual characteristics of a party associated with one or more of the devices. For instance, the optimized rendezvous location can be determined based on the vehicle type associated with one or more devices (e.g., autonomous vehicles may require additional space as compared to manually operated vehicles), particular vehicular attributes associated with one or more devices (e.g., the direction to open and close the trunk—lateral v. vertical), personal safety needs of passengers associated with one or more devices (e.g., young children), a target passenger type associated with one or more devices (e.g., passengers seeking mass transit versus passengers seeking a ridesharing type pickup), or any combination thereof.

In one or more embodiments, the optimized rendezvous request can come from a special status vehicle, such as an emergency personnel vehicle. In an embodiment, the special status vehicle can include a special status certificate that can be received at the infrastructure. In certain instances, the infrastructure can approve the special status certificate and arrange for a prioritized optimized rendezvous location. For example, the special status vehicle may include an ambulance and the optimized rendezvous location can be at an area blocked off for ambulatory or other emergency use. The infrastructure may be further configured to guide the special status vehicle to the rendezvous location. For instance, the infrastructure may provide site-specific operating instructions for maneuvering (e.g., between lanes, around other vehicles, etc.). In an embodiment, the infrastructure may further be configured to guide other vehicles in the area to avoid collision with the special status vehicle.

In one or more embodiments, the infrastructure can be configured to update the optimized rendezvous location in response to changing traffic data. For instance, a vehicle breakdown or unusually high volume of traffic in a particular zone might cause significant bottlenecking to occur. The infrastructure can be configured to update the optimized rendezvous location in response to such unpredictable occurrences. In one or more embodiments, the infrastructure can further update high-level rules of traffic flow in the area. For instance, a lane that was previously designated for thru-traffic may be repurposed by the infrastructure as an additional pick up lane. Similarly, a lane that was previously used for pick up can be repurposed by the infrastructure as a thru-traffic lane. In such a manner, the infrastructure can effectively manage changing traffic conditions associated with the area.

In one or more embodiments, the infrastructure can be configured to provide optimized rendezvous locations for one or more unassigned devices associated with a user (e.g., passenger or vehicle) in the area. For instance, the infrastructure can be configured to provide optimized rendezvous locations for pickup of pedestrians near a pedestrian pickup location with no vehicle currently assigned to provide pickup. By way of non-limiting example, the infrastructure may detect a pedestrian walking curbside along an airport terminal previously unassigned to a vehicle. The infrastructure can intelligently assign an optimized rendezvous location for a vehicle to the unassigned pedestrian. In an embodiment, the pedestrian can accept or decline the rendezvous prior to arrival of the vehicle.

In one or more embodiments, the infrastructure can be configured to form a queue for rendezvous. For instance, when a curbside is too congested to immediately assign an optimized rendezvous location to one or more devices associated with parties in the area, the infrastructure can initiate a queuing protocol to manage the vehicles in the immediate curbside area. In certain instances, the queue can be formed within an area associated with an optimized rendezvous location. In other instances, the queue can be formed outside of the area.

In one or more embodiments, the infrastructure can be configured to operate with advanced machine learning capabilities. Accordingly, the infrastructure may be able to better predict optimized rendezvous locations based on insight from historical data compared against current data. For instance, the infrastructure may be able to predict open curb spaces based on insights from historical data.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 illustrates a simplified view of an area 100, in accordance with one or more example embodiments of the present disclosure.

Referring to FIG. 1, there is shown a plurality of vehicles 102 and passengers 104 in an area 100. The area 100 can include a high trafficked area, such as a high burst traffic area. High burst traffic areas may include areas subject to high peak traffic at staggered intervals. By way of non-limiting example, the area 100 can include an area associated with an airport, a concert venue, or a sports arena where high burst traffic is common.

The area 100 can define one or more lanes 106 for vehicular operation. For example, in an embodiment, the area 100 can define at least two lanes 106, at least three lanes 106, or at least four lanes 106. The lanes 106 can define one-way or multiway traffic.

The area 100 can further define one or more zones 108 for passengers 104. The zones 108 can be differentiated from one another by one or more factors including, for example, the physical locations of the zones 108 relative to one another, the physical location of the zones 108 relative to the lanes 106, accessibility considerations (e.g., handicap, extra time needed, children on board), priority zones (e.g., upgraded), or special status (e.g., government and emergency vehicles). In an embodiment, the zones 108 can be disposed successively at a curbside 110 (e.g., in a row). In another embodiment, the zones can include a first zone at curbside 110 and one or more zones spaced apart from the curbside 110. In certain instances, the zones 108 can be spaced apart from one another. In other instances, the zones 108 can be immediately adjacent one another. This disclosure is not intended to be limited to those zones 108 or zone configurations previously described and can include various other differentiating factors or considerations dependent on the layout or traffic of the area 100.

In an embodiment, a transportation system in the area 100 can include a logic node 112. The logic node 112 can be configured to understand aspects of the layout of the area 100—including, for example, the number of lanes 106, lane directions, speed limits, traffic signs, curbside location, no parking areas, passenger waiting zones, crosswalks, and no entry areas. The logic node 112 can include a processor device. The logic node 112 may be connected with a communication element 114 configured to communicate with devices associated with one or more vehicles 102 and passengers 104 in the area 100. In an embodiment, the communication element 114 can include one or more low-latency, short-range wireless communication devices.

In an embodiment, the logic node 112 can include a centralized node. The centralized node can be securely certified by a recognized authority, such as a regulatory or private group to ensure system safety and security. In another embodiment, the logic node 112 can include a decentralized node. The decentralized node can include, for example, a plurality of user devices, such as smart user devices (e.g., smartphones, smart cars, autonomous cars). In an embodiment, the user device of at least one of a vehicle 102 and passenger 104 can understand aspects of the layout of the area 100. In another embodiment, the user device can communicate with nearby user devices to perform operations described in greater detail below.

Figure 2:
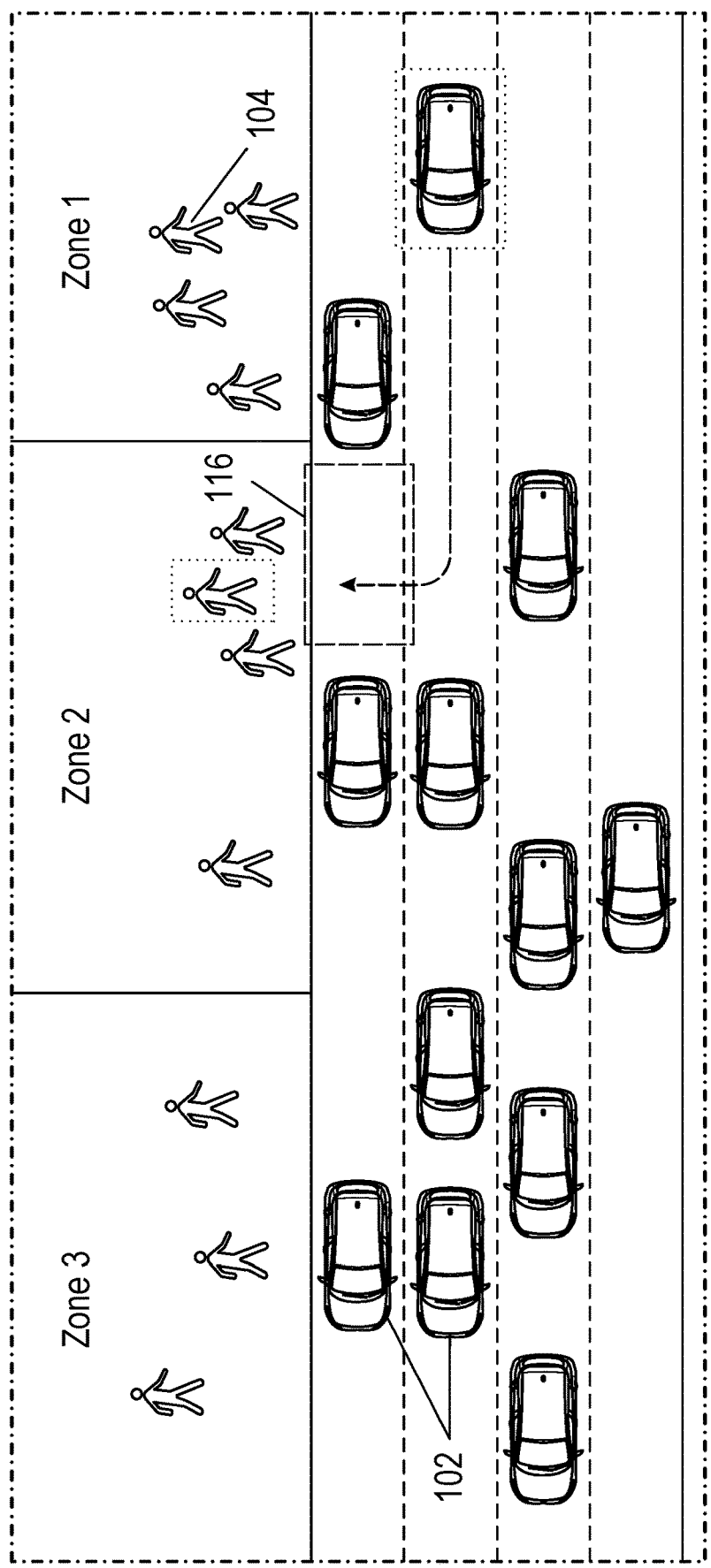
FIG. 2 includes a simplified view of an optimized rendezvous location within an area including a plurality of vehicles in accordance with an embodiment.

FIG. 2 illustrates a simplified view of the area 100, in accordance with one or more example embodiments of the present disclosure.

Referring to FIG. 2, the logic node 112 can be configured to determine optimized rendezvous locations 116 for one or more vehicles 102 and passengers 104 in the area 100. Optimized rendezvous between vehicle 102 and passenger 104 can reduce bottlenecking associated with high burst traffic areas (e.g., area 100). That is, vehicles 102 and pedestrians within the area 100 can be routed to optimized locations for increased spatial efficiency and decreased traffic congestion.

In an embodiment, the optimized rendezvous location 116 can be based at least in part on traffic data associated with the vehicles 102 in the area 100. Traffic data can include, for example, information corresponding with locations, speeds, trajectories, anticipated or estimated routes, or combinations thereof associated with the vehicles 102 in the area 100. In an embodiment, traffic data can be captured by one or more sensors, detectors, cameras, or other information acquiring devices. Traffic data can be captured on an ongoing basis. In an embodiment, traffic data can refresh multiple times per minute or even multiple times per second.

In an embodiment, the logic node 112 can update the optimized rendezvous location 116 after initial assignment. That is, for instance, updates may be made in response to changing traffic data. For example, one or more vehicular breakdowns in one lane 106 may warrant updated optimized rendezvous locations 116 based on current vehicle and passenger placements relative to the breakdown. The logic node 112 can be configured to adapt to changing traffic data and relay updates in real time. In certain instances it may be desirable to keep original optimized rendezvous locations despite the existence of one or more better solutions in order to avoid unnecessary adjustment or traffic disturbance. In other instance, the updated optimized rendezvous location can be determined and sent to the involved devices.

In certain instances, the area 100 can be too congested to form a new optimized rendezvous location 116. For instance, the curbside 110 may be fully occupied or one or more designated rendezvous locations can be overly congested. In such instances, the logic node 112 can be configured to form a queue. In certain instances, the queue can be formed within the area 100. In other instances, the queue can be formed outside of the area 100. For example, the queue can be formed near the area 100 but immediately outside thereof. One or more queueing areas can be configured near the area 100 to permit queue formation without causing traffic slowdowns and congestion. In an embodiment, the queue can include vehicles assigned to pick up passengers but low on prioritization or vehicles recently assigned to pick up passengers awaiting an opportunity to enter the area 100. In another embodiment, the queue can include unassigned vehicles awaiting passenger assignment.

In an embodiment, the logic node 112 can be configured to guide one or more of the vehicles 102 to its optimized rendezvous location 116. The logic node 112 can provide driving instructions to the device associated with the vehicle 102 (either autonomous or human operated) to navigate to the optimized rendezvous location 116. The instructions can include, for example, lane selection, lane adjustment locations, speed, cautionary notes, or other information helpful to safely and effectively navigate the vehicle 102 to the optimized rendezvous location 116. For autonomous vehicles, the instructions may interact directly or indirectly with a virtual driver system of the vehicle 102.

In an embodiment, the logic node 112 can be configured to guide other vehicles 102 in the area 100 (e.g., vehicles not associated with the rendezvous location 116). The logic node 112 can be configured to guide the other vehicles 102 in a way to minimize congestion at the optimized rendezvous location 116. For example, the logic node 112 can reroute traffic in one lane 106 to accommodate arrival of a large vehicle curbside 110. The logic node 112 can provide driving instructions to devices associated with the other vehicle 102 (either autonomous or human operated) to navigate safely within the area 100. The instructions can include, for example, lane selection, lane adjustment locations, speed, cautionary notes, or other information helpful to safely and effectively navigate in the area 100.

In an embodiment, the logic node 112 can be configured to arrange or facilitate optimized rendezvous locations 116 for a plurality of devices associated with multiple vehicles 102 and passengers 104 in the area 100 at the same time. In an embodiment, the logic node 112 can determine the optimized rendezvous location of devices associated with a first transportation scenario (e.g., a first vehicle 102 and a first passenger 104). The logic node 112 can further determine an optimized rendezvous location 116 for a second transportation scenario (e.g., a second vehicle 102 and a second passenger 104) before completion of the first transportation scenario. In such a manner, the logic node 112 can coordinate optimized rendezvous locations 116 for a plurality of vehicles 102 and passengers 104 in the area 100 at the same time. In an embodiment, the logic node 112 can be configured to determine optimized rendezvous locations 116 on an ongoing, continuous basis.

In an embodiment, the logic node 112 may detect unassigned devices associated with unassigned passengers 104 or vehicles 102 in the area 100. The logic node 112 can determine optimized rendezvous locations 116 for those unassigned devices. For example, the logic node 112 may detect an unassigned passenger 104, such as a pedestrian without an already assigned vehicular pickup. The logic node 112 can assign a vehicle 102 to pick up the passenger 104 and determine the optimized rendezvous location 116 there between. The optimized rendezvous location 116 can be communicated to the passenger 104 and vehicle 102 through the communication element 114. In another example, the logic node 112 may detect an unassigned device associated an unassigned vehicle 102 and assign a passenger 104 for pickup by the vehicle 102. The logic node 112 can further determine the optimized rendezvous location 116 for pickup and guide the passenger 104 and vehicle 102 to the optimized rendezvous location 116.

In certain instances, the logic node 112 can communicate optimized rendezvous locations between passengers 104 and vehicles 102 of mass-transit, such as buses. By way of non-limiting example, the area 100 can include designated identification protocol whereby passengers 104 can indicate their intent to use mass-transit. For instance, the area 100 can include signage with generic target vehicle identifiers (e.g., targetVehID=0) indicative of mass-transit pickup. The logic node 112 may detect the passenger's indicated intent and assign the passenger 104 to an appropriate mass-transit vehicle 102. Data from the assignments of passengers 104 to mass-transit vehicles 102 can be collected. Over time, mass-transit routes can be altered to accommodate detected patterns of user behavior, such as particular areas of heavy burst traffic requesting mass-transit pickup. The information may further advise on future mass-transit stops and pickup waiting times.

In an embodiment, the logic node 112 can be configured to prioritize one or more vehicles 102 within the area 100. In a more particular embodiment, the logic node 112 can be configured to grant priority to special status vehicles 102 over other vehicles 102 in the area 100. Special status vehicles can include emergency vehicles such as fire trucks, police cars, ambulances, or the like. Special status vehicles can include special status certificates indicative of the special status designated to the vehicle. In an embodiment, special status vehicle can receive the special status from a delegating authority, such as a governmental authority. Once received by the logic node 112, the special status certificates can confirm special status identity of the vehicle 102. In an embodiment, the special status certificate can be sent to the logic node 112 from the special status vehicle. In another embodiment, the special status certificate can be detected by the logic node 112. For instance, the logic node 112 can automatically check for special status certification upon entrance of vehicles 102 into the area.

Upon verifying the special status certificate, the logic node 112 can assign an optimized rendezvous location 116 for the special status vehicle. The optimized rendezvous location 116 for the special status vehicle may correspond with, for example, an emergency incident location. In an embodiment, the logic node 112 can be configured to guide the special status vehicle to the optimized rendezvous location 116. In a further embodiment, the logic node 112 can be configured to guide other vehicles 102 within the area 100 so as to facilitate easier transit of the special status vehicle to the optimized rendezvous location 116.

Figure 3:
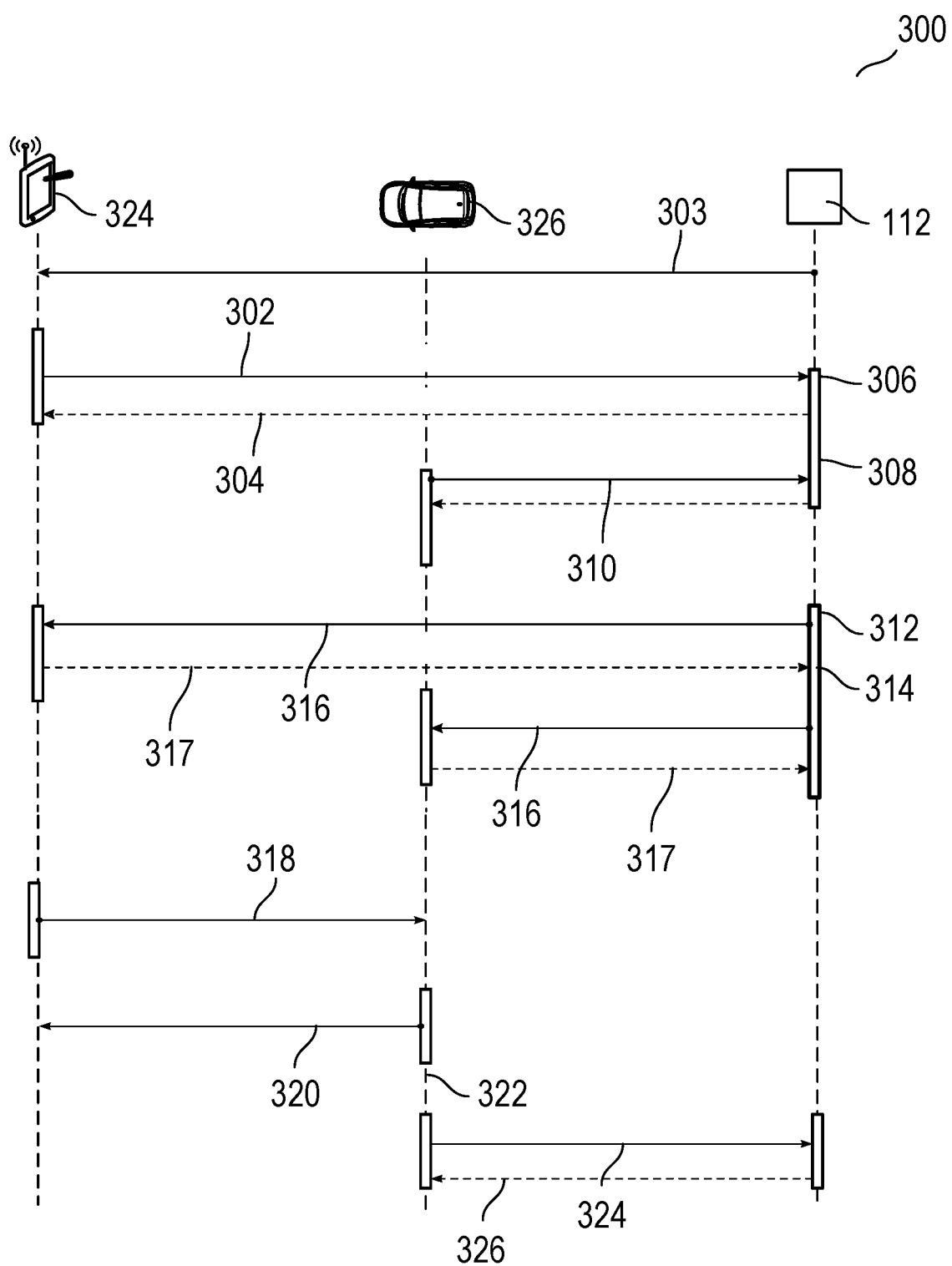
FIG. 3 includes a flow chart for determining an optimized rendezvous location in accordance with an embodiment.

FIG. 3 illustrates an exemplary flow chart 300 for determining optimized rendezvous locations in accordance with one or more example embodiments of the present disclosure.

Referring to FIG. 3, a logic node 112 can determine an optimized rendezvous location for a passenger device 324 and a vehicle 326 associated with the passenger device 324. While a method may be initiated by either the passenger device 324 or vehicle 326 associated with the passenger device 324, the following description is made with respect to passenger device 324 initiation.

At step 302, the passenger device may broadcast a rendezvous request. The rendezvous request can be received by the logic node 112. In an embodiment, the logic node 112 can acknowledge receipt of the rendezvous request to the passenger device 324 at step 304. In certain instances, the logic node 112 can broadcast to nearby devices associated with transportation scenarios of the presence and role of the logic node 112 at step 303. Broadcast of the message at step 303 may occur on an ongoing basis. In an embodiment, broadcast of the message at step 303 may occur prior to the passenger device broadcasting at step 302.

After receiving the rendezvous request at step 306, the logic node 112 can compare the request to existing entries (e.g., vehicle intent to pick up a passenger) at step 308. If no existing vehicle entries exist, the logic node can wait to match a vehicle to the passenger rendezvous request.

Upon receiving a signal at step 310 from a device associated with a suitable vehicle with intent to pick up a passenger, the logic node 112 can match the vehicle 326 and passenger device 324 at step 312. The logic node can further acknowledge receipt of the request from the vehicle in a unicast message. In certain instances, the logic node 112 can acknowledge receipt of the signal received at step 310 from a vehicle 326. In a particular embodiment, acknowledgement of receipt of the signal at step 310 can be performed via a unicast message with the device associated with the vehicle 326.

In an embodiment, the logic node 112 can further determine an optimized rendezvous location for the passenger and vehicle at step 314. In an embodiment, the optimized rendezvous location can be determined at least in part by analyzing traffic data associated with the area. As previously described, the traffic data can include information corresponding with locations, speeds, trajectories, anticipated or estimated routes, or combinations thereof associated with the vehicles in the area. In another embodiment, the optimized rendezvous location can be further determined by passenger data corresponding with a location of the passenger relative to the area of pickup and the nearby and associated zones and density (e.g., the density of available waiting space per areal unit) within the zones.

In an embodiment, the logic node 112 can analyze basic safety message (BSM) and personal safety message (PSM) data to determine the optimized rendezvous location. In a further embodiment, the logic node 112 can analyze other active pickup sessions in the area (e.g., other assigned optimized rendezvous locations) to determine an optimized rendezvous location for the current pickup. In such a manner, the logic node 112 can minimize conflicting optimized rendezvous locations.

After determining the optimized rendezvous location at step 314, the logic node 112 can be configured to communicate the optimized rendezvous location to the passenger device 324 passenger device 324 and vehicle 326 at step 316. In an embodiment, communication of the optimized rendezvous location can be performed by individual unicast messages. The communications can be secured, encrypted, or both. In a particular instance, the unicast messages can be sent to the vehicle 326 and the passenger device 324 simultaneously. At step 317, the vehicle 326 and/or passenger device 324 can be configured to acknowledge receipt of the optimized rendezvous location provided at step 316. In an embodiment, acknowledgement of receipt at step 317 can be performed via unicast message.

In certain instances the traffic density or pattern within the area of the transportation scenario may warrant an updated optimized rendezvous location. That is, the logic node may assign a new optimized rendezvous location in view of changing traffic data. The updated optimized rendezvous location can be communicated to the passenger device 324 and vehicle 326 on an as-needed basis or through another communication protocol.

In an embodiment, the logic node 112 can be configured to guide at least one of the vehicle 326 and passenger device 324 to the optimized rendezvous location. In certain instances, the logic node 112 can further guide at least one other vehicle in the area to minimize chance of collision with the vehicle in route to the optimized rendezvous location.

Upon arriving at the optimized rendezvous location, the passenger device 324 can notify the vehicle 326 of the arrival at the optimized rendezvous location at step 318. Similarly, the vehicle 326 can notify the passenger device 324 of arrival at the optimized rendezvous location at step 320.

Boarding of the passenger in the vehicle 326 can be performed at step 322 upon both parties successful arrival at the optimized rendezvous location.

The vehicle 326, passenger device 324, or both can then notify the logic node 112 of successful boarding at step 325. The logic node 112 may end the rendezvous request session in response to receiving the successful boarding notification at step 325. The logic node 112 may further acknowledge receipt of the notification of successful boarding at step 327.

In certain instances, data corresponding to the rendezvous request session can be saved for future analysis and even machine learning. In certain instances, the logic node may be augmented with advanced machine learning capabilities, permitting it to predict open curbside spaces based on insights from historical data when compared with currently ingested data.

Figure 4:
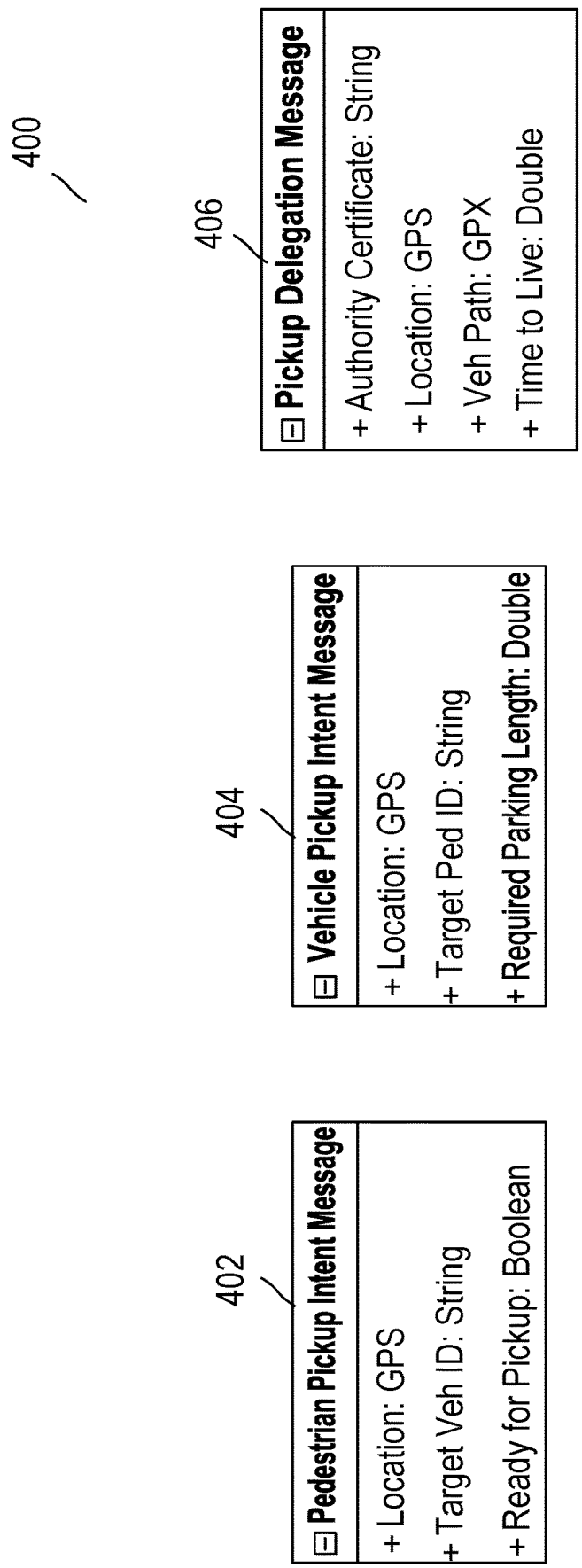
FIG. 4 includes message content included in steps of the flow chart in FIG. 3 in accordance with an embodiment.

FIG. 4 illustrates message content included in steps of the flow chart in FIGS. 3 and 4, in accordance with one or more example embodiments of the present disclosure.

FIG. 4 includes exemplary message content exchanged during a rendezvous request session.

At step 302 in FIG. 3, when the passenger device 324 initiates a rendezvous request, the passenger message content 402 may include, for example, the location of the passenger device 324, identification of a target vehicle type, and indication whether the passenger device 324 is ready for pickup. The passenger message content 402 can include location of the passenger, identification of a target passenger type—targetPedID: string (e.g., single person pickup v. multiple party pickup, destination information, or the like), and information associated with the passenger's attributes or special needs, such as a passenger needing additional consideration required to execute successful rendezvous. The passenger message content 402 can further include other information such as particular passenger needs, loading time requirements, or one or more other factors relating to the specific transportation scenario. For instance, the passenger message content 402 may include GPS data information, String data, GPS Exchange Format Data (GPX), and other file types associated with the rendezvous request session. It is understood that the above examples of passenger content 402 are for purposes of illustration and are not meant to be limiting.

At step 310, when the vehicle 326 initiates a vehicle pickup intent message, the vehicle message content 404 can include location of the vehicle, identification of a target passenger type targetPedID: string (e.g., single person pickup v. multiple party pickup, destination information, or the like), and information associated with the vehicle's attributes or special needs, such as parking space required to execute successful rendezvous. The vehicle message content 404 can further include other information and is not intended to be limited to those exemplary embodiments listed above. For instance, the vehicle message content 404 may include GPS data information, String data, GPS Exchange Format Data (GPX), and other file types associated with the rendezvous request session. It is understood that the above examples of vehicle message content 404 are for purposes of illustration and are not meant to be limiting.

Figure 5:
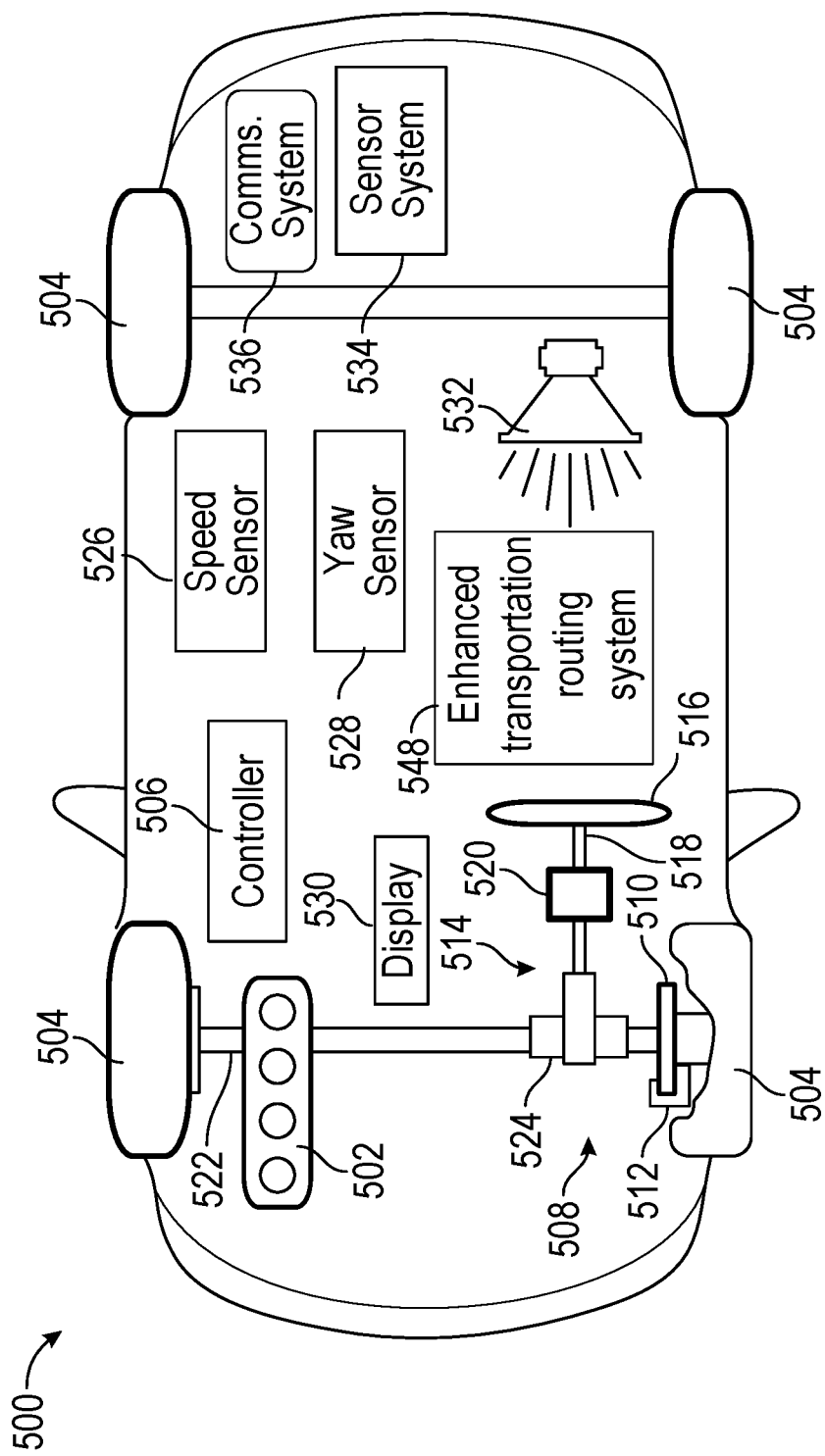
FIG. 5 is a schematic illustration of an example autonomous vehicle, in accordance with one or more embodiments of the disclosure.

In an embodiment the pickup delegation message at step 316 can include pickup delegation content 406 including authentication of the logic node 112 or an element associated therewith, coordinates of the optimized rendezvous location, a path for vehicular travel to the optimized rendezvous location, time required to rendezvous, or any combination thereof. The pickup delegation content 406 can further include other information and is not intended to be limited to those exemplary embodiments listed above FIG. 5 is a schematic illustration of an example autonomous vehicle in accordance with one or more embodiments of the disclosure. In particular, the antenna system and associated techniques described herein may be performed on any suitable vehicle including autonomous vehicles. In further examples, the antenna system may facilitate the interaction of an autonomous vehicle with its environment (e.g., a smart-city infrastructure, radio and Internet broadcasts, etc.). Referring to FIG. 5, an example autonomous vehicle 500 (which may correspond to the vehicle 102 of FIG. 1) may include a power plant 502 (such as a combustion engine and/or an electric motor) that provides torque to drive wheels 504 that propel the vehicle forward or backward. Autonomous vehicle operation, including propulsion, steering, braking, navigation, and the like, may be controlled autonomously by a vehicle controller 506. For example, the vehicle controller 506 may be configured to receive feedback from one or more sensors (e.g., sensor system 534, etc.) and other vehicle components to determine road conditions, vehicle positioning, and so forth. The vehicle controller 506 may also ingest data from the speed monitor and yaw sensor, as well as the tires, brakes, motor, and other vehicle components. The vehicle controller 506 may use the feedback and the route/map data of the route to determine actions to be taken by the autonomous vehicle, which may include operations related to the engine, steering, braking, and so forth. Control of the various vehicle systems may be implemented using any suitable mechanical means, such as servo motors, robotic arms (e.g., to control steering wheel operation, acceleration pedal, brake pedal, etc.), and so forth.

The vehicle controller 506 may include one or more computer processors coupled to at least one memory. The vehicle 500 may include a braking system 508 having disks 510 and calipers 512. The vehicle 500 may include a steering system 514. The steering system 514 may include a steering wheel 516, a steering shaft 518 interconnecting the steering wheel to a steering rack 520 (or steering box). The front and/or rear wheels 504 may be connected to the steering rack 520 via an axle 522. A steering sensor 524 may be disposed/located proximate to the steering shaft 518 to measure a steering angle. The vehicle 500 also includes a speed sensor 526 that may be disposed at the wheels 504 or in the transmission. The speed sensor 526 is configured to output a signal to the controller 506 indicating the speed of the vehicle. A yaw sensor 528 is in communication with the controller 506 and is configured to output a signal indicating the yaw of the vehicle 500.

In some embodiments, the vehicle 500 may include an enhanced transportation routing device 548 that is similar to the device described with respect to FIGS. 1-4 above.

The vehicle 500 includes a cabin having a display 530 in electronic communication with the controller 506. The display 530 may be a touchscreen that displays information to the passengers of the vehicle and/or functions as an input, such as whether or not the rider is authenticated. A person having ordinary skill in the art will appreciate that many different display and input devices are available and that the present disclosure is not limited to any particular display. An audio system 532 may be disposed within the cabin and may include one or more speakers for providing information and entertainment to the driver and/or passengers. The audio system 532 may also include a microphone for receiving voice inputs. The vehicle 500 may include a communications system 536 that is configured to send and/or receive wireless communications via one or more networks. The communications system 536 may be configured for communication with devices in the car or outside the car, such as a user's device, other vehicles, etc.

The vehicle 500 may also include a sensor system for sensing areas external to the vehicle. The vision system may include a plurality of different types of sensors and devices such as cameras, ultrasonic sensors, RADAR, LIDAR, and/or combinations thereof. The vision system may be in electronic communication with the controller 506 for controlling the functions of various components. The controller may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "lookup tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers and/or computer processors. The controller 506 may receive signals from the sensor system 534 and may include memory containing machine-readable instructions for processing the data from the vision system. The controller 506 may be programmed to output instructions to at least the display 530, the audio system 532, the steering system 514, the braking system 808, and/or the power plant 502 to autonomously operate the vehicle 500.

Figure 6:
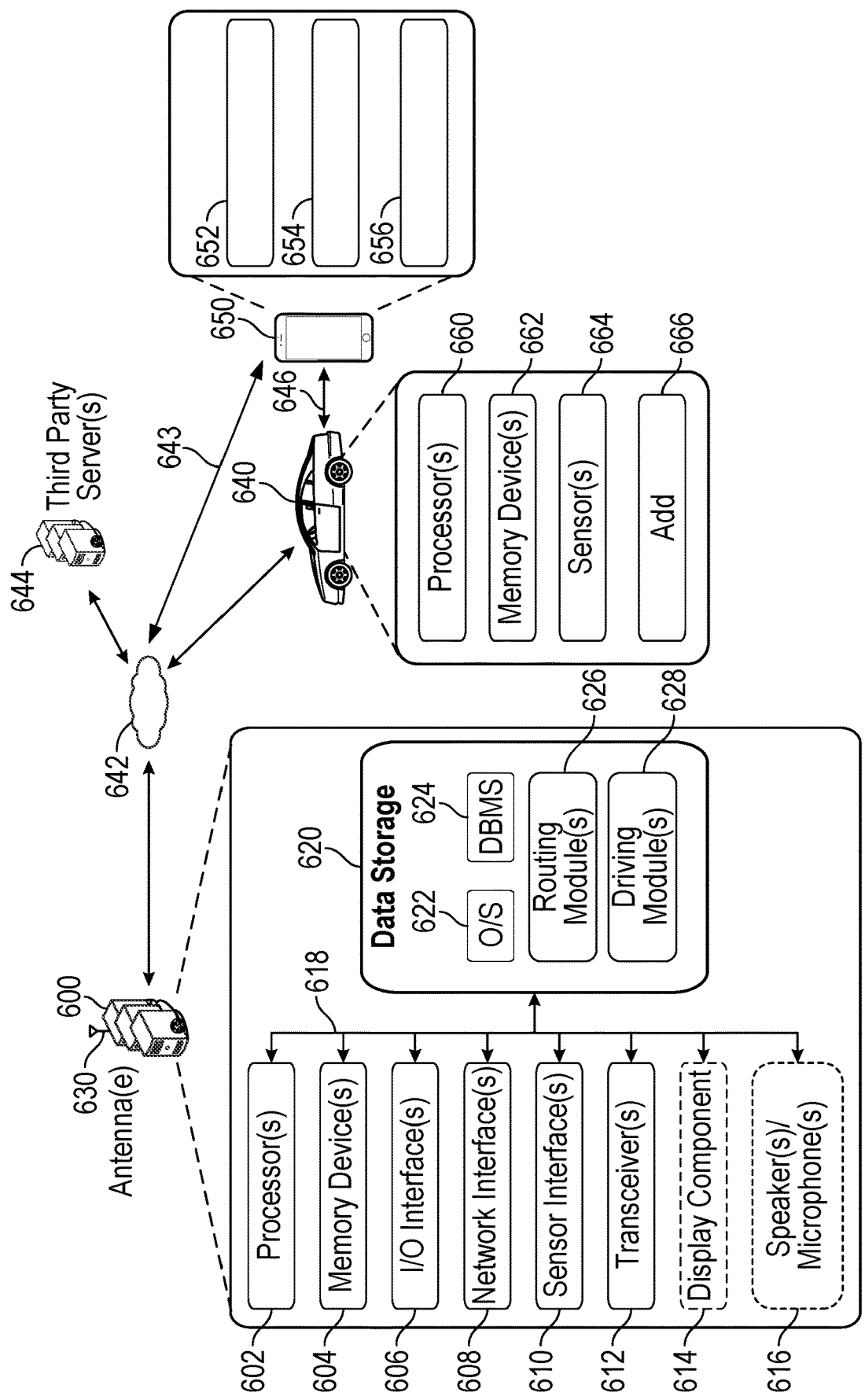
FIG. 6 is a schematic illustration of an example server architecture for one or more server(s), in accordance with one or more embodiments of the disclosure.

FIG. 6 is a schematic illustration of an example server architecture for one or more server(s) 600 in accordance with one or more embodiments of the disclosure. The server 600 illustrated in the example of FIG. 6 may correspond to a computer system configured to implement the functionality discussed with respect to FIGS. 1-5. In particular, the server 600 may be used to configure and/or transmit and receive information from the disclosed antenna system, as further described below. Some or all of the individual components may be optional and/or different in various embodiments. In some embodiments, the server 600 illustrated in FIG. 6 may be located at a vehicle 640. For example, some or all or the hardware and functionality of the server 600 may be provided by the vehicle 640. In an embodiment, the server 600 can include multiple servers working cooperatively with a shared state (e.g., shared table of pending and active rendezvous instances). The distribution of wireless communication can be handled in a manner so as to reduce the load on each node and extend the overall range of the system. The server 600 may be in communication with the vehicle 640, as well as one or more third-party servers 644 (e.g., servers that store vehicle condition data, user device data, antenna system data, etc.), and one or more user devices 650. The vehicle 640 may be in communication with the user device 650.

The server 600, the third-party server 644, the vehicle 640, and/or the user device 650 may be configured to communicate via one or more networks 642. The vehicle 640 may additionally be in wireless communication 646 with the user device 650 via a connection protocol such as Bluetooth or Near Field Communication. The vehicle 640 may also be in wireless communication 643 with the one or more networks 642 providing the vehicle 640 to establish communication with the server 600 and/or the third party server 644. The server 600 may be configured to communicate via one or more networks 642. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 600 may include one or more processors (processor(s)) 602, one or more memory devices 604 (also referred to herein as memory 604), one or more input/output (I/O) interface(s) 606, one or more network interface(s) 608, one or more sensor(s) or sensor interface(s) 610, one or more transceiver(s) 612, one or more optional display components 614, one or more optional camera(s)/speaker(s)/microphone(s) 616, and data storage 620. The server 600 may further include one or more bus(es) 618 that functionally couple various components of the server 600. The server 600 may further include one or more antenna(s) 630 that may include, without limitation, a cellular antenna for transmitting or receiving signals to/from a cellular network infrastructure, an antenna for transmitting or receiving Wi-Fi signals to/from an access point (AP), a GNSS antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit the exchange of information (e.g., data (including computer-executable code), signaling, etc.) between various components of the server 600. The bus(es) 618 may include, without limitation, a memory bus or a memory controller, a peripheral bus, an accelerated graphics port, and so forth. The bus(es) 618 may be associated with any suitable bus architecture.

The memory 604 of the server 600 may include volatile memory (memory that maintains its state when supplied with power) such as random-access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

The data storage 620 may include removable storage and/or non-removable storage including, but not limited to, magnetic storage, optical disk storage, and/or tape storage. The data storage 620 may provide non-volatile storage of computer-executable instructions and other data.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. More specifically, the data storage 620 may store one or more operating systems (O/S) 622; one or more database management systems (DBMSs) 624; and one or more program module(s), applications, engines, computer-executable code, scripts, or the like such as, for example, one or more routing module(s) 626 and/or one or more driving module(s) 628. Some or all of these module(s) may be sub-module(s). Any of the components depicted as being stored in the data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in the data storage 620 may support functionality described in reference to corresponding components named earlier in this disclosure.

The processor(s) 602 may be configured to access the memory 604 and execute the computer-executable instructions loaded therein. For example, the processor(s) 602 may be configured to execute the computer-executable instructions of the various program module(s), applications, engines, or the like of the server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit.

Referring now to functionality supported by the various program module(s) depicted in FIG. 6, the routing module(s) 626 may include computer-executable instructions, code, or the like that responsive to execution by one or more of the processor(s) 602 may perform one or more blocks of the process flows herein and/or functions including, but not limited to, determining vehicle conditions described herein based on data from vehicle devices and/or sensors, determining vehicle locations, determining antenna switching behavior, and/or the like.

The routing module 626 may be in communication with the vehicle 640, the third-party server 644, the user device 650, and/or other components. For example, the routing module may send route data to the vehicle 640, receive data from the third-party server 644, receive user selections from the user device 650, and so forth.

The driving module(s) 628 may include computer-executable instructions, code, or the like that responsive to execution by one or more of the processor(s) 602 may perform functions including, but not limited to, sending and/or receiving data, determining a vehicle condition, and the like. In some embodiments, the driving module 628 may be partially or wholly integral to the vehicle 640.

The driving module 628 may be in communication with the vehicle 640, the third-party server 644, the user device 650, and/or other components. For example, the driving module may send traffic information to the vehicle 640, receive location data from the third-party server 644, receive user inputs (e.g., login information for a wireless connection) from user device 650, and so forth.

Referring now to other illustrative components depicted as being stored in the data storage 620, the O/S 622 may be loaded from the data storage 620 into the memory 604 and may provide an interface between other application software executing on the server 600 and the hardware resources of the server 600.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. As noted, in various embodiments, databases may store information associated with antenna systems and/or vehicle conditions.

Referring now to other illustrative components of the server 600, the input/output (I/O) interface(s) 606 may facilitate the receipt of input information by the server 600 from one or more I/O devices as well as the output of information from the server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. The I/O interface(s) 606 may also include a connection to one or more of the antenna(s) 630 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The server 600 may further include one or more network interface(s) 608 via which the server 600 may communicate with any of a variety of other systems, platforms, networks, devices, and so forth. The network interface(s) 608 may enable communication, for example, with one or more wireless routers, one or more host servers, one or more web servers, and the like via one or more networks.

The sensor(s)/sensor interface(s) 610 may include or may be capable of interfacing with any suitable type of sensing device such as, for example, inertial sensors, force sensors, thermal sensors, photocells, and so forth.

The display component(s) 614 may include one or more display layers, such as LED or LCD layers, touchscreen layers, protective layers, and/or other layers. The optional camera(s) 616 may be any device configured to capture ambient light or images. The optional microphone(s) 616 may be any device configured to receive analog sound input or voice data. The microphone(s) 616 may include microphones used to capture sound.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module.

It should further be appreciated that the server 600 may include alternate and/or additional hardware, software, or firmware components beyond those described or depicted without departing from the scope of the disclosure.

The user device 650 may include one or more computer processor(s) 652, one or more memory devices 654, and one or more applications, such as a vehicle application 656. Other embodiments may include different components.

The processor(s) 652 may be configured to access the memory 654 and execute the computer-executable instructions loaded therein. For example, the processor(s) 652 may be configured to execute the computer-executable instructions of the various program module(s), applications, engines, or the like of the device to cause or facilitate various operations to be performed in accordance with one or more embodiments of the disclosure. The processor(s) 652 may include any suitable processing unit capable of accepting data as input, processing the input data in accordance with stored computer-executable instructions, and generating output data. The processor(s) 652 may include any type of suitable processing unit.

The memory 654 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

Referring now to functionality supported by the user device 650, the vehicle application 656 may be a mobile application executable by the processor 652 that can be used to present options and/or receive user inputs of information related to network status, external connections, user device status and/or the like.

The vehicle 640 may include one or more computer processor(s) 660, one or more memory devices 662, one or more sensors 664, and one or more applications, such as an autonomous driving application 666. Other embodiments may include different components.

The processor(s) 660 may be configured to access the memory 662 and execute the computer-executable instructions loaded therein. For example, the processor(s) 660 may be configured to execute the computer-executable instructions of the various program module(s), applications, engines, or the like of the device to cause or facilitate various operations to be performed in accordance with one or more embodiments of the disclosure. The processor(s) 660 may include any suitable processing unit capable of accepting data as input, processing the input data in accordance with stored computer-executable instructions, and generating output data. The processor(s) 660 may include any type of suitable processing unit.

The memory 662 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

Referring now to functionality supported by the vehicle 640, the autonomous driving application 666 may be a mobile application executable by the processor 660 that can be used to receive data from the sensors 664, and/or control operation of the vehicle 640.

One or more operations of the methods, process flows, and use cases of FIGS. 1-6 may be performed by one or more engines, program module(s), applications, or the like executable on an electronic device. It should be appreciated, however, that such operations may be implemented in connection with numerous other device configurations.

The operations described and depicted in the illustrative methods and process flows of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Systems in accordance with one or more embodiments described herein may facilitate more efficient use of space in areas of high traffic, particularly those of high burst traffic.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The terms "generally," "substantially," "approximately," and the like are intended to cover a range of deviations from the given value. In a particular embodiment, the terms "generally," "substantially," "approximately," and the like refer to deviations in either direction of the value within 10% of the value, within 9% of the value, within 8% of the value, within 7% of the value, within 6% of the value, within 5% of the value, within 4% of the value, within 3% of the value, within 2% of the value, or within 1% of the value.

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the vehicular and transportation arts.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:

1. A transportation system comprising:
  a logic node comprising a processor configured to determine an optimized rendezvous location for a vehicle in an area based at least in part on traffic data associated with a plurality of vehicles in the area and update the optimized rendezvous location for the vehicle based at least in part on changing traffic data; and
  a communication element adapted to communicate the optimized rendezvous location and the updated optimized rendezvous location to a device associated with one or more actors associated with the optimized rendezvous location,
  wherein the logic node is further configured to receive a special status certificate associated with a special status vehicle in the area, and wherein the optimized rendezvous location of the special status vehicle is prioritized with respect to other vehicles in the area.

2. The transportation system of claim 1, wherein the optimized rendezvous location is determined in response to a passenger pickup request and a passenger pickup location, and wherein the communication element is further configured to communicate the pickup location to the passenger.

3. The transportation system of claim 1, wherein the optimized rendezvous location is further based on a layout of the area and driving laws associated with the area.

4. The transportation system of claim 1, wherein the logic node is further configured to guide the vehicle to the optimized rendezvous location.

5. The transportation system of claim 4, wherein the logic node is further configured to guide other vehicles of the plurality of vehicles in the area to minimize congestion at the optimized rendezvous location.

6. The transportation system of claim 1, wherein the traffic data comprises information corresponding with locations, speeds, trajectories, and anticipated or estimated routes associated with the plurality of vehicles in the area.

7. The transportation system of claim 1, wherein the logic node is configured to determine other rendezvous locations of other vehicles of the plurality of vehicles in the area during a transit time of the vehicle to the optimized rendezvous location.

8. The transportation system of claim 1, wherein the logic node is configured to detect devices associated with unassigned actors in the area and assign an optimized rendezvous location for at least one of the unassigned actors and a device associated with a complementary actor, wherein the unassigned actor comprises a passenger prior to vehicle assignment.

9. The transportation system of claim 8, wherein the complementary actor comprises a mass transit vehicle or an unassigned vehicle.

10. A device comprising processing circuitry coupled to storage, the processing circuitry configured to:
  identify a broadcast message from an infrastructure node associated with a security role comprising a processor;
  send a pickup request to a logic node, wherein the request comprises indicating a starting location and destination;
  identify an optimized rendezvous location based at least in part on traffic data associated with a plurality of vehicles in an area of the pickup request;
  communicate the optimized rendezvous location to a device associated with one or more actors associated with the optimized rendezvous location;
  update the optimized rendezvous location for the vehicle based at least in part on changing traffic data;
  communicate the updated optimized rendezvous location to the device associated with the one or more actors associated with the optimized rendezvous location;
  receive, at the logic node, a special status certificate associated with a special status vehicle in the area; and
  prioritize the optimized rendezvous location of the special status vehicle with respect to other vehicles in the area.

11. The device of claim 10, wherein the optimized rendezvous location is further based on a layout of the area and driving laws associated with the area.

12. The device of claim 10, wherein the traffic data comprises information corresponding with locations, speeds, trajectories, and anticipated or estimated routes associated with the plurality of vehicles in the area.

13. A method of transportation comprising:
  receiving, at a logic node, a rendezvous request in an area, wherein the area is adapted to receive a plurality of vehicles;
  determining, by the logic node, an optimized rendezvous location in the area based at least in part on traffic data associated with the plurality of vehicles in the area;
  communicating the rendezvous location to a device associated with one or more actors associated with the optimized rendezvous location;
  updating the optimized rendezvous location based at least in part on changing traffic data;
  communicating the updated optimized rendezvous location to the device associated with the one or more actors associated with the optimized rendezvous location;
  receiving, at the logic node, a special status certificate associated with a special status vehicle in the area; and
  prioritizing the optimized rendezvous location of the special status vehicle with respect to other vehicles in the area.

14. The method of claim 13, further comprising:
  by a device associated with a passenger in the area, creating the rendezvous request, wherein the rendezvous request corresponds with a pickup request and a pickup location; and
  communicating the pickup location to the passenger.

15. The method of claim 13, further comprising guiding, by the logic node, the vehicle to the optimized rendezvous location.

16. The method of claim 15, further comprising guiding other vehicles of the plurality of vehicles in the area to minimize congestion at the optimized rendezvous location.

17. The method of claim 13, further comprising sending to the devices of one or more of the assigned actors, by unicast message from the logic node, an authentication certificate authenticating the logic node.

\* \* \* \* \*